United States Patent [19]

Naito

[11] Patent Number: 5,210,454
[45] Date of Patent: May 11, 1993

[54] DRIVING CIRCUIT FOR AN ULTRASONIC MOTOR

[75] Inventor: Masafumi Naito, Kanagawa, Japan

[73] Assignee: Asmo Co., Ltd., Kosai, Japan

[21] Appl. No.: 732,067

[22] Filed: Jul. 18, 1991

[30] Foreign Application Priority Data

Jul. 18, 1990 [JP] Japan .................................. 2-190085

[51] Int. Cl.$^5$ ........................................... H01L 41/08
[52] U.S. Cl. .................................... 310/316; 310/317; 310/328; 318/116
[58] Field of Search ................. 318/116; 310/316, 317, 310/328

[56] References Cited

U.S. PATENT DOCUMENTS

| | | | |
|---|---|---|---|
| 4,510,411 | 4/1985 | Hakamota et al. | 310/316 |
| 4,703,213 | 10/1987 | Güasler | 318/116 |
| 4,713,571 | 12/1987 | Suzuki et al. | 310/316 |
| 4,799,896 | 6/1988 | Suzuki et al. | 310/316 |
| 4,833,358 | 5/1989 | Suzuki et al. | 310/316 |
| 5,021,700 | 6/1991 | Takahashi et al. | 310/316 |
| 5,036,263 | 7/1981 | Yamada et al. | 318/116 |

FOREIGN PATENT DOCUMENTS

| | | |
|---|---|---|
| 0062739 | 6/1985 | Japan .................................. 310/316 |
| 60-176470 | 9/1985 | Japan . |
| 61-221583 | 10/1986 | Japan . |

Primary Examiner—Mark O. Budd
Assistant Examiner—Thomas M. Dougherty
Attorney, Agent, or Firm—Stetina and Brunda

[57] ABSTRACT

An improved driving circuit for an ultrasonic motor is disclosed. The driving circuit includes an oscillator that outputs an oscillating signal. A driving means receives the oscillation and an input control signal and outputs a drive signal that drives the ultrasonic motor. The driving means is arranged to gradually alter the driving signal in response to the input signal by modifying the oscillation signal and amplifying the modified signal. In this manner the rotational speed of the ultrasonic motor is gradually change in response to the operational condition changes ordered by the input device.

7 Claims, 4 Drawing Sheets

DRIVING CIRCUIT FOR AN ULTRASONIC MOTOR

BACKGROUND OF THE INVENTION

This application claims the priority of Japanese Patent Application No. 2-190085 filed on Jul. 18, 1990, which is incorporated herein by reference.

FIELD OF THE INVENTION

The present invention relates to a driving circuit for an ultrasonic motor.

DESCRIPTION OF THE RELATED ART

An ultrasonic motor makes very little noise in steady operation because it operates at a low speed with a high torque, and does not require reduction gears. In one applications, such ultrasonic motors are used in the headrest of a vehicle seat. This permits the headrest to move without making audible noises.

In some ultrasonic motors of the above-described type, a piezoelectric element having two electrodes is attached to the stator. High frequency voltages of different phases are then applied to the piezoelectric element to drive the rotor which is pressed against the stator. In one driving circuit for such an ultrasonic motor, a pulse signal from an oscillator 21 is applied to a first electrode 25 of the piezoelectric element via an amplifier 23, as shown in FIG. 4. The phase of that pulse signal is changed by a phase shifter 26, and is then applied via an amplifier 27 to the second electrode 28.

When the ultrasonic motor 22 starts or stops running, or runs reversely, however, the voltage which is applied to the ultrasonic motor 22 rapidly change as shown in FIG. 5. Accordingly, the rotor of the ultrasonic motor 22 rotates at a high speed, thereby generating irritating noises which are undesirable.

SUMMARY OF THE INVENTION

It is therefore an object of the present invention to provide an ultrasonic motor which makes less noise during steady operation.

To achieve the foregoing object, an improved driving circuit for an ultrasonic motor is disclosed. The driving circuit includes an oscillator that outputs an oscillating signal. An input device generates an input signal for directing a change in an operational condition of the ultrasonic motor. A driving means receives both the oscillation and input signals and outputting a drive signal that drives the ultrasonic motor. The driving means is arranged to gradually alter the driving signal in response to the input signal by modifying the oscillation signal and amplifying the modified signal. In this manner the rotational speed of the ultrasonic motor is gradually change in response to the operational condition changes ordered by the input device.

In a preferred embodiment the driving means includes a signal control circuit and an amplifier means. The signal control circuit alters the pulse width of the oscillation signal to convert the oscillation signal to a control signal that gradually changes in response to changes ordered by the input device. The amplifier amplifies the control signal to provide a drive signal that is applied to the ultrasonic motor.

BRIEF DESCRIPTION OF THE DRAWINGS

The features of the present invention that are believed to be novel are set forth with particularity in the appended claims. The invention, together with the objects and advantages thereof, may best be understood by reference to the following description of the presently preferred embodiment together with the accompanying drawings in which:

DETAILED DESCRIPTION OF THE PREFERRED EMBODIMENT

Figure 2:
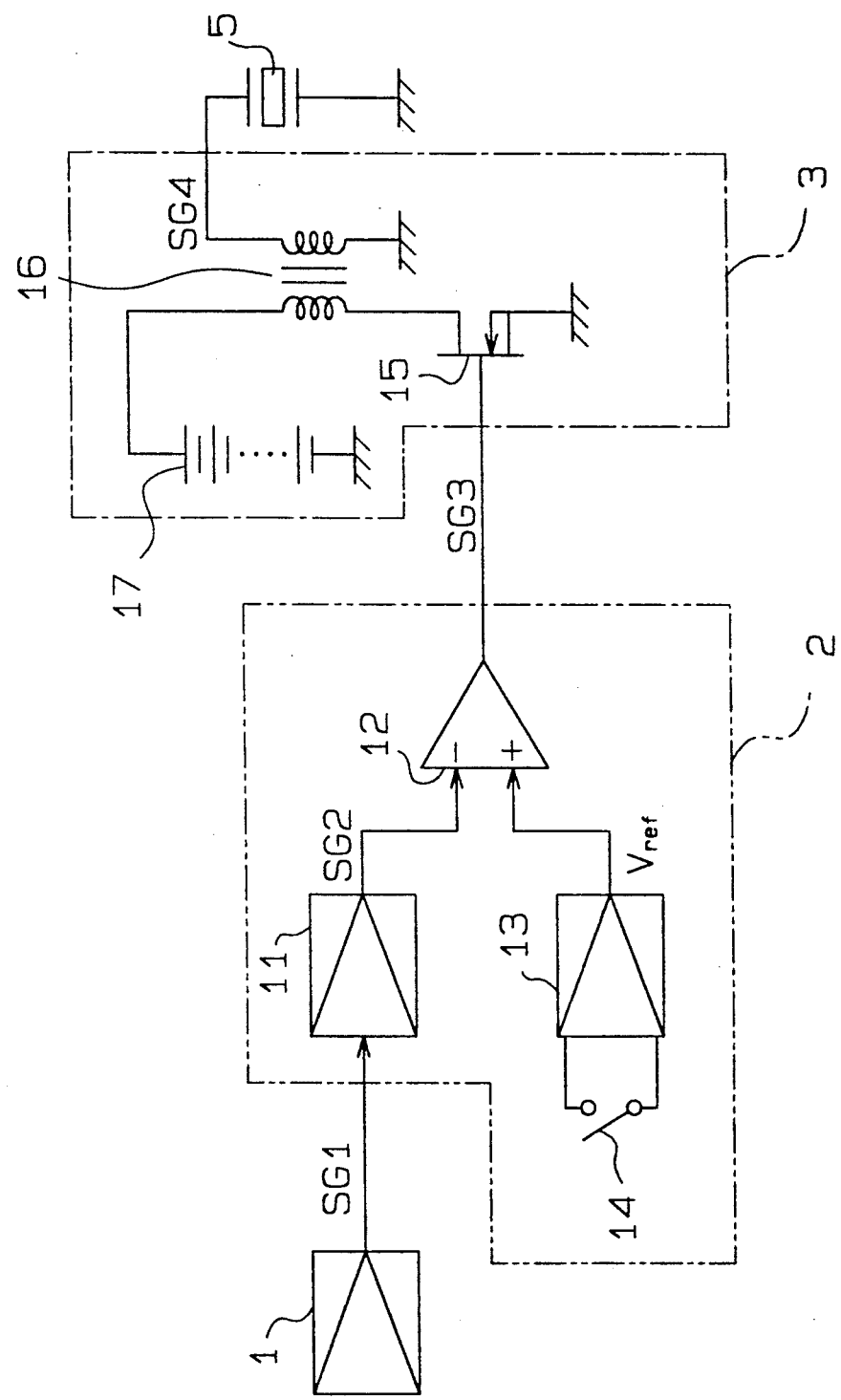
FIG. 2 is a block diagram illustrating essential portions of the driving circuit shown in FIG. 1.
Figure 3:
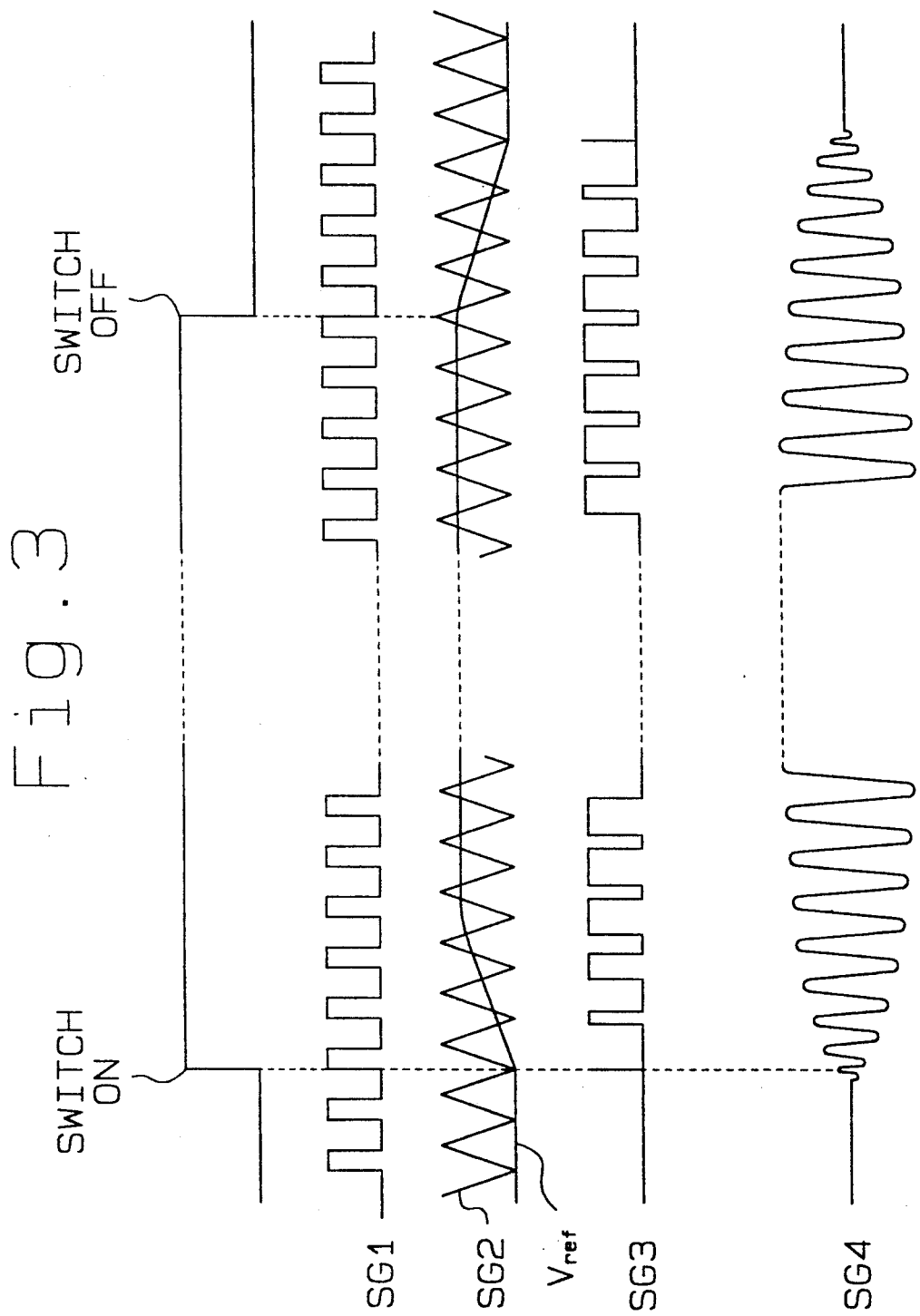
FIG. 3 is a time chart expressing waveforms output from individual circuits shown in FIG. 2 in association with one another in terms of time.
Figure 4:
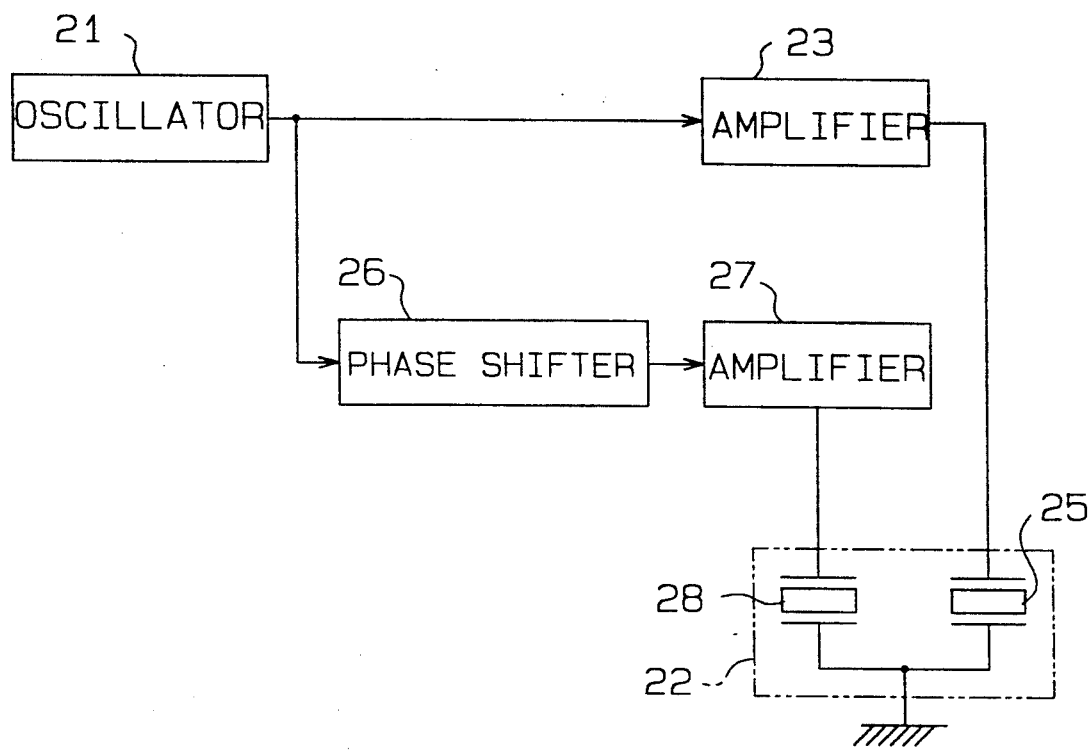
FIG. 4 is a block diagram showing a conventional driving circuit for an ultrasonic motor.
Figure 5:
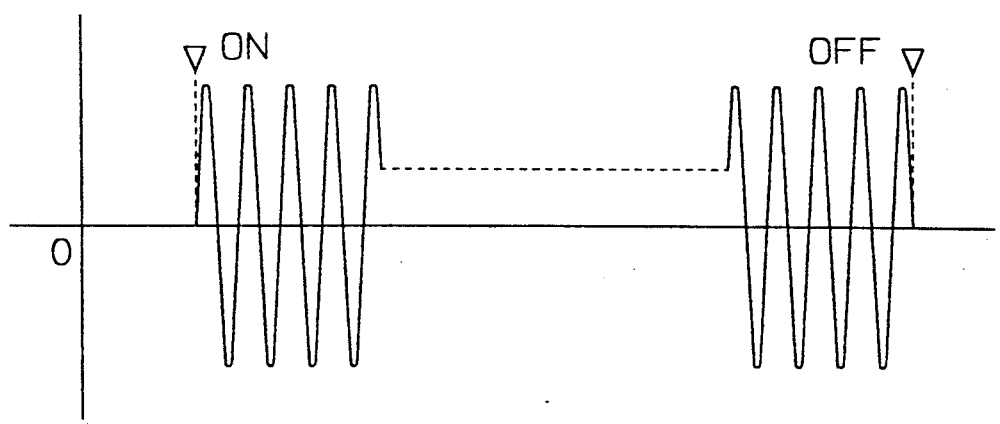
FIG. 5 is a waveform diagram representing a drive voltage when the ultrasonic motor is activated, is stopped, and is rotated in the reverse direction according to the prior art.

One preferred embodiment of a driving circuit for an ultrasonic motor according to the present invention will now be described referring to FIGS. 1 to 3.

The ultrasonic motor (not shown) used in this embodiment has a piezoelectric element with two electrodes adhered to the reverse side of a ring-shaped stator. The piezoelectric element then generates a progressive wave on the surface of the stator to drive a rotor about the stator.

Figure 1:
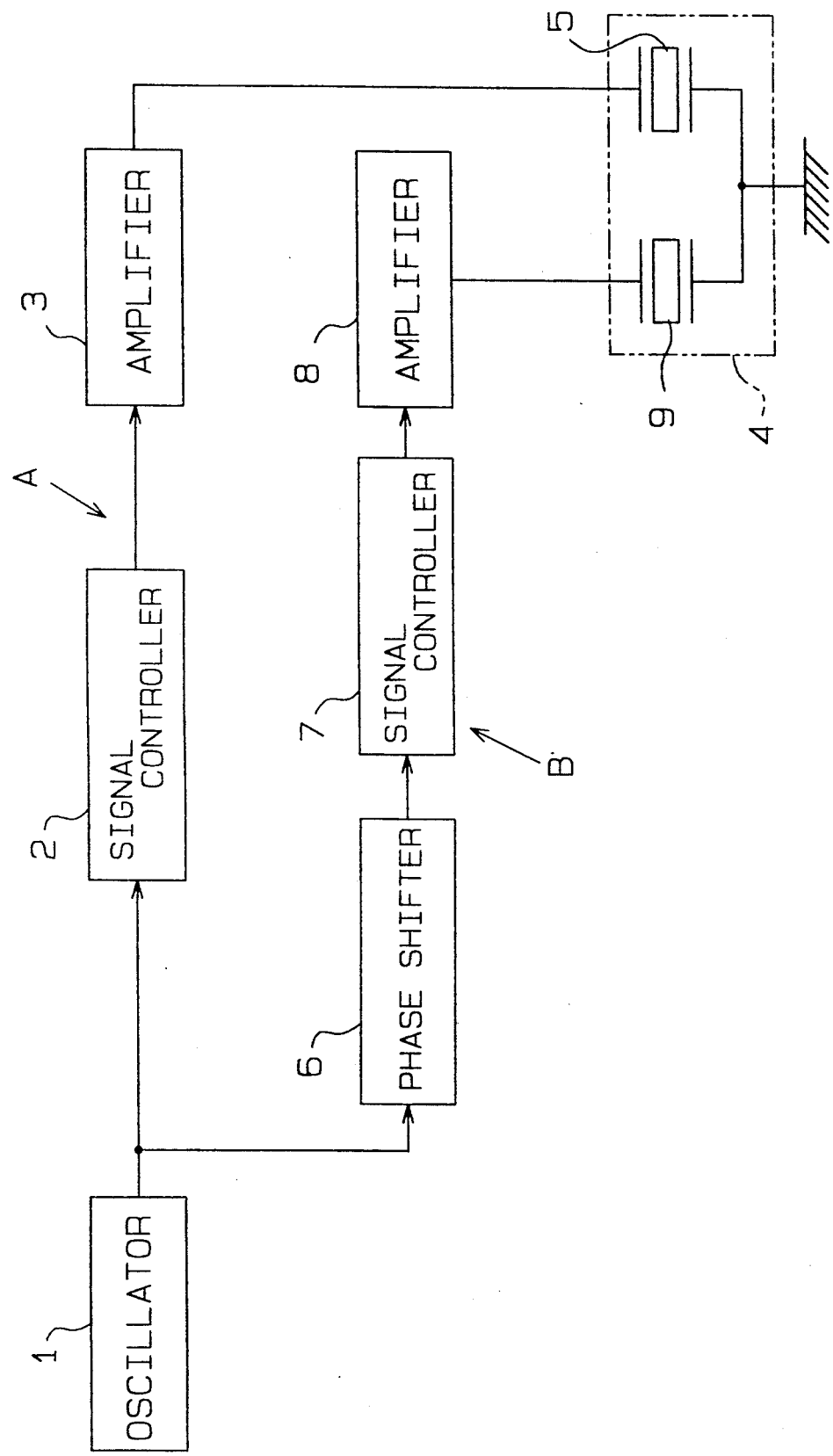
FIG. 1 is a block diagram illustrating a driving circuit for an ultrasonic motor according to the present invention.

As shown in FIG. 1, the driving circuit for the ultrasonic motor comprises an oscillator 1, which outputs an oscillating voltage signal, and a pair of parallel circuits that serve to connect the oscillator to an ultrasonic motor 4. The first circuit A of the parallel circuit includes a signal controller 2 and an amplifier 3. The signal controller 2 outputs a transistor control signal based on the oscillator timing, but in certain circumstances having a modified pulse width. The amplifier 3 provides a high frequency drive signal which is effectively an amplification of the transistor control signal output by the signal controller 2. The high frequency drive signal is then applied to a first electrode 5 of the ultrasonic motor 4.

The second circuit B of the parallel circuit includes a phase shifter 6 which provides high frequency voltages of different phases, a signal controller 7 and an amplifier 8. The amplified drive signal output from the amplifier 8 is applied to the second electrode 9 of the ultrasonic motor 4.

The essential portions of the driving circuit shown in FIG. 2, namely, the signal controllers 2 and 7, and the amplifiers 3 and 8, will now be explained referring to a time chart shown in FIG. 3. Since the signal controller 2 and the amplifier 3 along the first circuit A respectively have the same structures as the signal controller 7 and the amplifier 8 along the second circuit B, the explanation will be given only of the former set of components referring to the drawings.

The oscillator 1, constituted of a crystal oscillator, sends an oscillating signal SG1 having a train of rectangular waves, which continue at predetermined cycles, to the signal controller 2.

The signal controller 2 has a triangular wave generator 11, a reference voltage generator 13 and a comparator 12 which compares signals from these generators.

The triangular wave generator 11 converts the pulse voltage signal SG1 into a triangular wave signal SG2 in such a manner that the leading edge of the signal SG1 becomes the wave trough of the signal SG2. The signal SG2 is then sent to the negative terminal of the comparator 12.

The reference voltage generator 13 in the signal controller 2 is an integrating circuit, and a switch 14 for activating the generator 13 is a push button type switch. The switch 14 is rendered ON while being depressed and rendered OFF when it is released. With the switch 14 ON, the reference voltage generator 13 sends a reference voltage Vref to the positive terminal of the comparator 12. When the switch 14 is set ON the reference voltage Vref gradually increases up to a predetermined value. After the switch is set OFF, the reference voltage Vref gradually decreases down to zero.

The comparator 12 compares the triangular wave signal SG2 with the reference voltage Vref and determines the pulse width transistor control signal SG3 outputted to the amplifier 3. The pulse width of the transistor control signal SG3 changes in proportion to the value of the reference voltage Vref. When the switch 14 is set ON, the Pulse width gradually becomes wider until it reaches a predetermined value. When the switch 14 is set OFF, the pulse width gradually decreases, and with the reference voltage of 0 V the transistor control signal SG3 does not oscillate.

The amplifier 3 has an FET 15 and a transformer 16. The FET 15 is driven during a period equal to the pulse width of the transistor control signal sent from the comparator 12. When driven, the a current from an electric source 17 passes to the drain of the FET 15. Therefore, the FET 15 renders the primary coil of the transformer 16 conductive during the period when the FET 15 is activated. The transformer 16 sends a motor drive voltage signal SG4 to the electrode 5 of the piezoelectric element in the ultrasonic motor 4. The pulse height of the motor drive voltage signal varies according to a change in the pulse width of the transistor control signal SG3. With the switch 14 ON, the pulse height of the signal SG3 gradually rises to a predetermined level. With the switch OFF, the pulse height gradually drops, and the transformer 16 stops sending the motor drive voltage signal SG4.

The operation of the described driving circuit for the ultrasonic motor will now be explained.

When the switch 14 is depressed to move a headrest in a vehicle, the reference voltage generator 13 applies the integrated reference voltage Vref to the comparator 12. The reference voltage Vref does not quickly change in response to the ON/OFF operation of the switch 14. Therefore, the voltage Vref slowly rises or drops with a given delay.

The pulse voltage signal SG1 from the oscillator 1 is converted into the triangular wave signal SG2 by the triangular wave generator 12, and the signal SG2 is sent to the comparator 12. The comparator 12 compares the reference voltage Vref with the triangular wave signal SG2. The comparator 12 then supplies the transistor control signal SG3, whose pulse width gradually changes in accordance with the reference voltage Vref, to the FET 15 to drive it. The FET 15 renders the primary coil of the transformer 16 conductive in the period corresponding to the pulse width of the transistor control signal SG3. The transformer 16 therefore does not spontaneously respond to the ON/OFF operation of the switch 14, and applies the motor drive voltage signal SG4, whose voltage value slowly rises or falls, to the electrodes 5 and 9 of the piezoelectric element of the ultrasonic motor 4. Accordingly, sudden starting and stopping of the ultrasonic motor 4 can be avoided, thus preventing the generation of noise.

Although only one embodiment of the present invention has been described herein, it should be apparent to those skilled in the art that the present invention may be embodied in many other specific forms without departing from the spirit or scope of the invention.

What is claimed is:

1. A driving circuit for an ultrasonic motor comprising:
    an oscillator means for outputting a substantially rectangular pulse oscillation signal;
    an input means for generating an input signal for directing a change in an operational condition of the ultrasonic motor;
    a driving means for receiving the oscillation and input signals and outputting a drive signal for driving the ultrasonic motor, the driving means being arranged to gradually alter the driving signal in response to the input signal by producing a control signal influenced by the input and oscillation signals and amplifying the control signal, whereby the gradual change in the drive signal causes the rotational speed of the ultrasonic motor to gradually change in response to the operational condition changes ordered by the input means;
    said driving means includes a signal control means for altering the pulse width of the oscillation signal to convert the oscillation signal to a control signal that gradually changes in response to changes ordered by the input mean sand an amplifying means for amplifying the control signal form the signal control means to provide the drive signal to be applied to the ultrasonic motor;
    said oscillator and the ultrasonic motor are connected by two parallel circuits, the signal control means and the amplifying means being provided in each of the parallel circuits, the driving circuit further comprising a phase shifting means for shifting a phase of the oscillation signal supplied to one of the parallel circuits; and
    said input means is arranged to provide a discrete input signal having first voltage step intended to turn on the ultrasonic motor and a second voltage step intended to turn off the ultrasonic motor, and the signal control means includes a triangular wave generator for converting the oscillation signal from the oscillator into a signal having a triangular waveform, a reference voltage generator connected with and actuated by said input means for producing a reference signal, the reference voltage generator being arranged such that the voltage of the reference signal gradually changes in a first direction in response to the first voltage step in the input signal and gradually changes in a reverse direction in response to the second voltage step and a comparator for comparing the triangular wave signal with the reference signal and outputting the control signal based on a difference therebetween.

2. A driving circuit according to claim 1, wherein the input means is a switch for driving the reference voltage generator.

3. A driving circuit for an ultrasonic motor comprising:
    an oscillator for outputting a rectangular pulse signal;

an input means for generating an input signal for directing a change in a rotational speed of the ultrasonic motor;

a signal control means for altering the pulse width of the oscillation signal to convert the oscillation signal to a control signal that gradually changes in response to changes ordered by the input means;

an amplifying means for amplifying the control signal from the signal control means to provide a drive signal to be applied to the ultrasonic motor;

wherein the oscillator and the ultrasonic motor are connected by two parallel circuits, the signal control means and the amplifying means being provided in each of the parallel circuits, the driving circuit further comprising a phase shifting means for shifting a phase of the oscillation signal supplied to one of the parallel circuits;

wherein the input means is arranged to provided a discrete input signal having first voltage step intended to turn on the ultrasonic motor and a second voltage step intended to turn off the ultrasonic motor, and the signal control means includes:

a triangular wave generator for converting the oscillation signal from the oscillator into a signal having a triangular waveform;

a reference voltage generator connected with and actuated by said input means for producing a reference signal, the reference voltage generator being arranged such that the voltage of the reference signal gradually changes in a first direction in response to the first voltage step in the input signal and gradually changes in a reverse direction in response to the second voltage step; and a comparator for comparing the triangular wave signal with the reference signal and outputting the control signal based on a difference therebetween.

4. A driving circuit according to claim 3 wherein the amplifying means includes:
   a switching element to be turned on or off by the control signal from the signal control means; and
   a transformer driven by the switching element.

5. A driving circuit according to claim 3, wherein the input means is a switch for driving the reference voltage generator.

6. A driving circuit for an ultrasonic motor comprising:
   an oscillator for outputting an oscillation signal having rectangular pulses;
   an input means for generating an input signal for directing a change in a rotational speed of the ultrasonic motor, the input means being arranged to provide a discrete input signal having first voltage step intended to turn on the ultrasonic motor and a second voltage step intended to turn off the ultrasonic motor;
   a phase shifter that receives the oscillation signal and outputs a phase shifted oscillation signal;
   a first signal control means for receiving the oscillation signal from the oscillator, and a second signal control means for receiving the phase shifted signal, the first and second signal control means each including,
      a triangular wave generator for converting their associated oscillation signal into a triangular wave signal,
      a reference voltage generator connected with and actuated by said input means for producing a reference signal, the reference voltage generator being arranged such that the voltage of the reference signal gradually changes in a first direction in response to the first voltage step in the input signal and gradually changes in a reverse direction in response to the second voltage step; and
      a comparator for comparing the triangular wave signal with a reference voltage and outputting a control signal based on a difference therebetween;
   first and second amplifying means for respectively amplifying the control signals from the first and second signal control means and outputting drive signals to be applied to the ultrasonic motor, the first and second amplifying means each including,
      a switching element to be turned on or off by the associated control signal, an
      a transformer driven by the switching element for outputting the drive signal to an electrode of a piezoelectric element of the ultrasonic motor.

7. A driving circuit according to claim 6, wherein the input means is a switch for driving the reference voltage generator.

* * * * *